US011069236B2

(12) United States Patent
Tonguz et al.

(10) Patent No.: US 11,069,236 B2
(45) Date of Patent: Jul. 20, 2021

(54) SYSTEMS AND METHODS FOR VIRTUAL TRAFFIC LIGHTS IMPLEMENTED ON A MOBILE COMPUTING DEVICE

(71) Applicant: CARNEGIE MELLON UNIVERSITY, Pittsburgh, PA (US)

(72) Inventors: Ozan K. Tonguz, Pittsburgh, PA (US); Luca Kubin, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 0 days.

(21) Appl. No.: 16/644,723

(22) PCT Filed: Oct. 5, 2018

(86) PCT No.: PCT/US2018/054604
§ 371 (c)(1),
(2) Date: Mar. 5, 2020

(87) PCT Pub. No.: WO2019/071122
PCT Pub. Date: Apr. 11, 2019

(65) Prior Publication Data
US 2020/0286377 A1  Sep. 10, 2020

Related U.S. Application Data

(60) Provisional application No. 62/606,736, filed on Oct. 5, 2017.

(51) Int. Cl.
*G08G 1/07* (2006.01)
*G08G 1/0967* (2006.01)
(Continued)

(52) U.S. Cl.
CPC ....... *G08G 1/096708* (2013.01); *G01C 21/30* (2013.01); *G01S 19/423* (2013.01); *G08G 1/096791* (2013.01); *H04W 4/44* (2018.02)

(58) Field of Classification Search
CPC ...... G08G 1/096708; G08G 1/096791; H04W 4/44; G01C 21/30; G01S 19/423
See application file for complete search history.

(56) References Cited

U.S. PATENT DOCUMENTS 6,366,219 B1 * 4/2002 Hoummady ............. G08G 1/04
340/907
8,050,854 B1 11/2011 Chandra et al.
(Continued)

OTHER PUBLICATIONS

International Search Report and Written Opinion for International application No. PCT/US2018/054604, dated Dec. 21, 2018, 7 pages.
(Continued)

*Primary Examiner* — Munear T Akki
(74) *Attorney, Agent, or Firm* — Kacvinsky Daisak Bluni PLLC

(57) ABSTRACT

Disclosed herein is an implementation of a Virtual Traffic Lights (VTL) application implemented as an app on a mobile computing device in which online mapping services provide information necessary to determine a lead vehicle among one or more vehicles approaching an intersection. The lead vehicle controls status of virtual traffic lights at the intersection. The information retrieved from in the online mapping service may be used to determine whether vehicles approaching intersection are moving closer or farther apart from each other, the direction of travel of the vehicles, the geographic location of the intersection, and the distance between each vehicle and the geographic location of the intersection.

19 Claims, 7 Drawing Sheets

(51) Int. Cl.
*H04W 4/44* (2018.01)
*G01C 21/30* (2006.01)
*G01S 19/42* (2010.01)

(56) References Cited

U.S. PATENT DOCUMENTS

| | | | |
|---|---|---|---|
| 8,761,991 | B1 | 6/2014 | Ferguson et al. |
| 8,972,159 | B2 | 3/2015 | Ferreira et al. |
| 2003/0210156 | A1 | 11/2003 | Nishimura |
| 2005/0104745 | A1 | 5/2005 | Bachelder et al. |
| 2007/0115139 | A1 | 5/2007 | Witte et al. |
| 2007/0208494 | A1* | 9/2007 | Chapman ............ G08G 1/0104 701/117 |
| 2008/0243388 | A1 | 10/2008 | Eguchi et al. |
| 2009/0063030 | A1 | 3/2009 | Howarter et al. |
| 2012/0056756 | A1 | 3/2012 | Yester |
| 2012/0112928 | A1* | 5/2012 | Nishimura ............ G08G 1/07 340/909 |
| 2013/0116915 | A1* | 5/2013 | Ferreira ............ G08G 1/00 701/117 |
| 2013/0304364 | A1 | 11/2013 | Miller et al. |
| 2014/0278029 | A1* | 9/2014 | Tonguz ............ G08G 1/087 701/117 |
| 2016/0019784 | A1 | 1/2016 | Peri |
| 2016/0071418 | A1 | 3/2016 | Oshida et al. |
| 2017/0110011 | A1 | 4/2017 | Tonguz et al. |
| 2017/0256167 | A1* | 9/2017 | Kim ............ G08G 1/166 |
| 2019/0250639 | A1* | 8/2019 | Xu ............ G08G 1/096827 |
| 2020/0326203 | A1* | 10/2020 | Lund ............ G08G 1/096716 |

OTHER PUBLICATIONS

International Search and Written Opinion for International application No. PCT/US2018/043090, dated Oct. 25, 2018, 11 pages.
International Search Report and Written Opinion for International application No. PCT/US2018/054504, dated on Jan. 16, 2019, 11 pages.

* cited by examiner

SYSTEMS AND METHODS FOR VIRTUAL TRAFFIC LIGHTS IMPLEMENTED ON A MOBILE COMPUTING DEVICE

RELATED APPLICATIONS

This application is a national phase filing under 35 U.S.C. § 371 claiming the benefit of and priority to International Patent Application No. PCT/US2018/054604, filed on Oct. 5, 2018, which claims the benefit of U.S. Provisional Patent Application No. 62/606,736, filed Oct. 5, 2017. The entire contents of these applications are incorporated herein by reference.

BACKGROUND

Virtual Traffic Lights (VTL) is a recently proposed solution to the traffic congestion problem in urban areas. VTL removes the need for infrastructure-based traffic signaling devices at each intersection by moving the traffic signal into the vehicle. The VTL algorithm is dependent upon vehicles being able to communicate with each other as they approach intersections, such that one of the approaching vehicles may be selected as the VTL "leader" to control which approaches to the intersection have red signals and which approaches have green signals. The ability of inter-vehicle communication allows a more efficient control of the signaling devices.

The main goal of VTL is to increase traffic flow and/or to reduce commute time, especially during rush hours. A second important goal is to increase the safety of intersections that are not equipped with traffic signals. In the United States, for example, only about 1% of all intersections are equipped with traffic signals (even in New York City, only about 24% of intersections are equipped with traffic signals). While the original VTL scheme assumes a 100% penetration ratio, recently it has been shown that VTL can be implemented even with low penetration levels, such as 5-10% at the initial stages.

The VTL algorithm is described in U.S. Pat. No. 8,972,159, which describes an algorithm for use at an ideal intersection wherein vehicles communicate with each other prior to reaching the intersection, and which assumes that vehicle-to-vehicle communication is possible. A second version of the VTL algorithm is described in PCT application PCT/US18/54504 and addresses a non-ideal intersection at which vehicle-to-vehicle communication may not be possible prior to the vehicles reaching or being very near to the intersection. This may be caused, for example, by obstructions at the corners of the intersection such as high-rises, large buildings, trees, etc.

Both the ideal VTL and non-ideal VTL algorithms are fully efficient when all vehicles on the road are equipped with VTL infrastructure built into the vehicle. This would include, for example, a means of communication with the other vehicles, a source of geolocation information, such as GPS, a processor for executing software implementing the algorithms, and a means for indicating the state of the traffic signals within the vehicles, such as a display screen or heads-up display. As should be realized, it may take several years for all vehicles on the road to be equipped with the required infrastructure for full participation in VTL. Therefore, it is may be necessary to provide interim solutions which allow non-VTL enabled vehicles to participate in VTL.

One such interim solution is described in PCT application PTC/US18/43090. This solution assumes that a small percentage of vehicles are equipped with dedicated short-range communication (DSRC) radios, which were mandated for use in vehicles by the U.S. Department of Transportation in 2014. This interim solution places infrastructure at the intersections to allow DSRC-equipped vehicles to communicate with the traffic signal control device at the intersections. However, it would be desirable to provide an interim solution that does not require additional investment in infrastructure by local governments.

SUMMARY OF THE INVENTION

Disclosed herein is smartphone-based or tablet-based application (app) for providing an implementation of the Virtual Traffic Lights Protocol. This allows a gradual phasing-in of VTL as the number of VTL-enabled vehicles increases, and allows older, non-VTL-equipped vehicles to participate.

The proposed solution is based on a fully distributed architecture facilitated by vehicle-to-vehicle communications (V2V). The communications between different vehicles can be implemented using standard smart-phone connectivity (LTE, Bluetooth, Wi-Fi and WiFi Direct (the WiFi peer-to-peer (P2P) standard) in a way that mimics the behavior of the DSRC radios. In other embodiments, it is contemplated to allow the app to operate with aftermarket DSRC radios or to operate in vehicles having a DSRC radio but not the rest of the VTL implementation (i.e., the software and the virtual traffic light display). In yet other embodiments, a dedicated device providing the display of the virtual traffic signals could be provided in lieu of a smart phone or tablet computing device. It should be noted that while using DSRC radio technology is the preferred embodiment of the invention disclosed in this patent application, other embodiments using other wireless technologies (such as WiFi, LTE, LTE-A, 5G, etc.) could also be possible.

In a preferred embodiment of the invention, the Google Map Application Program Interface (API) is used for localization and intersection detection without any other external map. This approach allows the VTL prototype to work at any kind of intersection. For purposes of this disclosure, an intersection is determined to be located at the center of the intersection, which can be unequivocally identified by using the street names that define the specific intersection.

DETAILED DESCRIPTION

As used herein, the term "orthogonal", when used in reference to roads at an intersection, does not require that the roads be at right angles to each other, but should be interpreted to mean any number of roads that cross each other at an intersection, wherein vehicles on "orthogonal" roads will collide if reaching the intersection at the same time.

In the VTL protocol, one of the most important issues is the conflict detection process, which triggers an algorithm to select a VTL leader. The VTL leader is the vehicle that controls the traffic signals at the intersection. When two or more vehicles are approaching the same intersection from orthogonal directions, they are in a conflict situation and a collision is possible.

Figure 1:
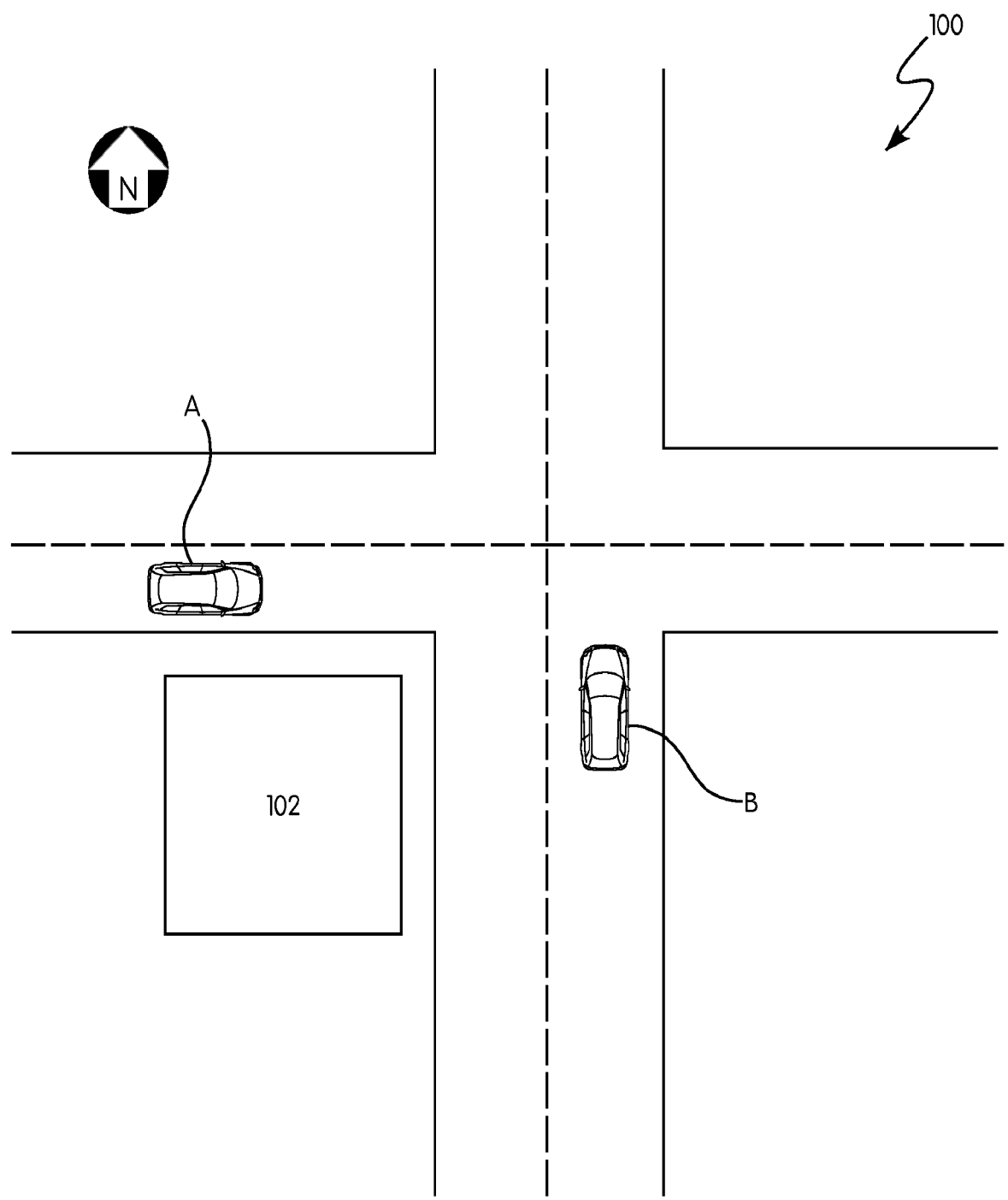
FIG. 1 shows an intersection having two conflicting vehicles approaching.

The VTL protocol avoids any possible collision. When a conflict is detected, one vehicle is selected as the VTL leader and, in one embodiment, presents a red light indication in its own vehicle and broadcasts a message to all other vehicles approaching the intersection. The message contains an instruction to display a red light indicator for other vehicles in its own approach and approaching from the opposite direction, and an instruction to display a green light indicator for the vehicles approaching the intersection from an orthogonal approach. Two or more vehicles are in conflict if they are approaching the same intersection but from orthogonal streets, as shown in FIG. 1.

For safety reasons, in preferred embodiments, the VTL leader should be the vehicle farthest from the intersection center among the first vehicles (the cluster leaders) in the four approaches. As shown in FIG. 1, vehicle A would be the VTL leader. Because the preferred embodiment of the VTL algorithm requires a determination of which vehicle is the farthest from the center of the intersection, the precise position of the intersection center is required.

Figure 2:
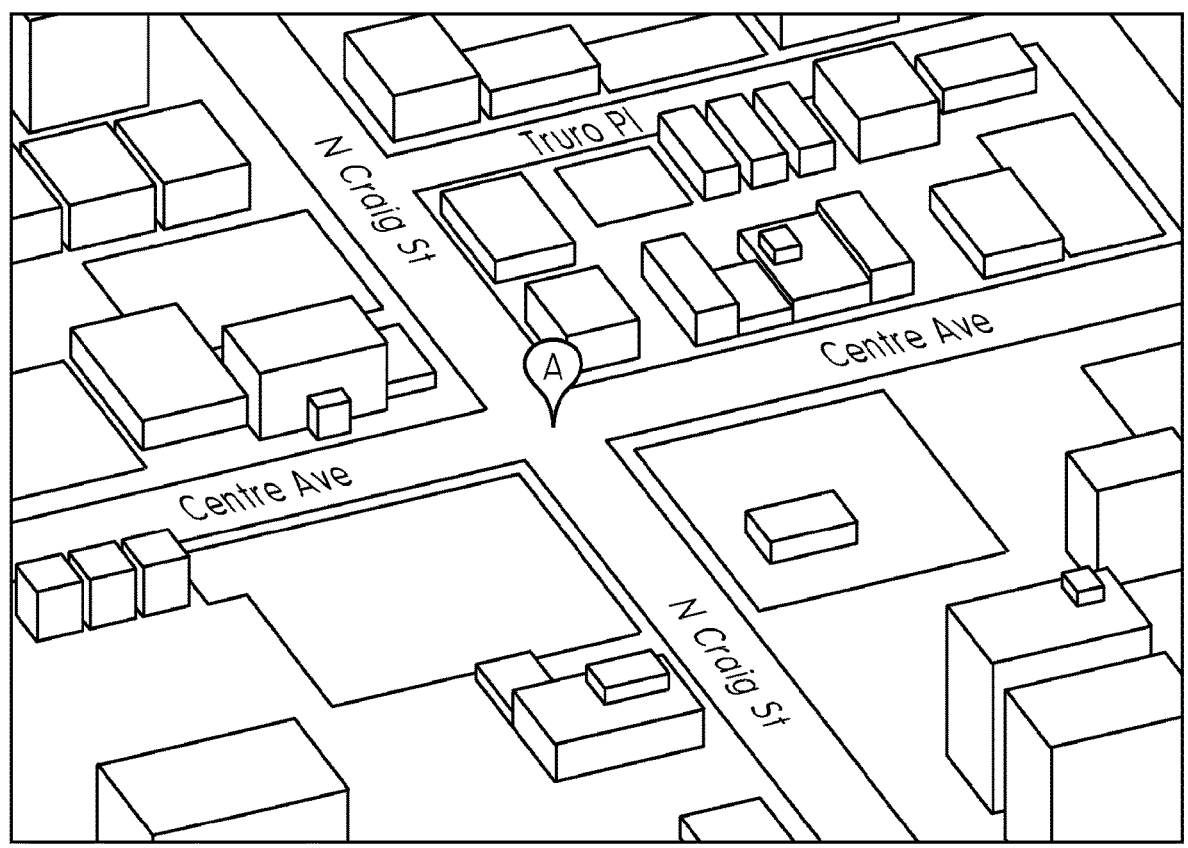
FIG. 2 is an example of Google Maps providing the location of an intersection given the names of the intersecting streets.

Google Maps provides the latitude and longitude of each intersection using the name of the two streets that meet at that intersection. For example, if one wants to know the latitude and the longitude of the intersection center between Centre Avenue and North Craig Street in Pittsburgh, Pa., one can easily search this information on Google Maps. Google Maps responds to this query by showing the exact position of the intersection center, as shown in FIG. 2 by the red arrow labeled "A". To get the latitude and the longitude of this point, one can right click on the arrow and select the "What's here?" option, which causes the latitude and longitude of the requested intersection to display. Google Maps also provides an application programming interface (API) for retrieving the same information.

To detect a possible conflict, the following information is needed:
1. The direction in which the vehicle is traveling;
2. The current geographic position of the vehicle; and
3. The geographic position of the intersection.

In one embodiment, the Assisted GPS (AGPS) system of each smartphone can provide the geographic position of the device (and therefore the vehicle) in latitude and longitude. In other embodiments, the geographic position of the device can be provided by a DSRC radio having a built-in GPS function. In yet other embodiments, information regarding the geographic position of the device may be provided by any known method or device. For example, the Google Location Manager API can provide this information. Using the Google API, the update frequency of the AGPS can be set in terms of time and space. As an example, by setting the update distance to 0 m and the update time to 30 ms, the system will try to upload the current position every 30 ms and can receive this position information in a timely manner if the communication network is not in a congested state.

To obtain vehicle position, each vehicle can easily compute the name of the street on which it is traveling using the Google Geocoder API. The Google Geocoder converts the latitude and longitude of a location to a human readable address, while the inverse Google Geocoder converts an address to latitude and longitude points. Unfortunately, this API is unable to provide the geographic position of an intersection.

To find the geographic position of an intersection, the Google Geocoding API may be used. Geocoding is an HTTP based service that replies to an HTTP request. The reply can be in one of two different formats, an XML object or a JSON Object (Java Script Object Notation). The JSON Object requires less memory and therefore is the better solution in terms of delay performance. However, the Google Geocoding API has access limits for each user: 2500 requests per 24 hour period for free users and 100,000 requests per 24 hour period for Google Maps for Business. If a user exceeds the 24-hour limit, the APIs may stop working for that user temporarily. If the user continues to exceed this limit, their access to the APIs may be blocked.

To get the intersection information, a query very similar to the standard Google Maps query can be used. For instance, if latitude and the longitude of the intersection between Terrace St and Darragh St in Pittsburgh, Pa., is needed, the following URL may be used to find this information:

http://maps.googleapis.com/maps/api/geocode/json?addres
    s= Terrace+St+and+Darragh+St,+Pittsburgh+,+PA&sensor=false The returned object contains the information in double precision in JAVA-SCRIPT fashion:

"formatted_address" : "Terrace Street & Darragh Street, University of
    Pittsburgh, Pittsburgh, PA 15213, USA",
    "geometry" : {
        "location" : {
            "lat" : 40.4419548,
            "lng" : -79.9628374
        }, After acquiring this information, each vehicle broadcasts periodically (e.g., every 100 ms) a beacon packet containing:
1. Two latitude and longitude pairs in the order [lat(t1), long(t1), lat(t2), long(t2)] where t2>t1, [lat(t2), long(t2)] is the last latitude and longitude pair computed while [lat(t1), long(t1)] is the previous one.
2. The name of the street that the vehicle is traveling on (e.g., "Terrace Street").

The conflict detection algorithm works as follows. When vehicle A receives a beacon packet from vehicle B, it first checks the address information. If the street reported by vehicle B (i.e., the street on which vehicle B is currently travelling) is different from that of vehicle A, there is a high probability that the streets on which vehicle A and vehicle B are on will intersect. Before submitting the query for the intersection position, vehicle A needs to know if B is coming close.

Suppose that A's latitude and longitude pair is denoted as (lat, long). Using the 2 pairs of coordinates in the beacon packet, A will know that B is getting close if and only if:

$$(lat-lat(t_1))^2+(long-long(t_1))^2>(lat-lat(t_2))^2+(long-long(t_2))^2 \quad (1)$$

and also:

$$|lat-lat(t_1)|+|long-long(t_1)|+|lat+lat(t_1)|>|lat-lat(t_2)|+$$
$$|long-long(t_2)|+|lat+lat(t_2)| \qquad (2)$$

If the angular distance is getting shorter, it implies that the real distance (this should not be confused with the Euclidean distance because it is a distance on the earth surface: i.e., an arc on a circle) is getting shorter as well.

At this point, if the two vehicles on two different streets are traveling toward the same intersection, then the receiver vehicle makes a query and provides the latitude and the longitude of the intersection center. By calculating the distance between the two vehicles and the intersection center respectively, it can be determined which vehicle is farther from the intersection. In a preferred embodiment of the invention, the vehicle farthest from the intersection center will become the VTL leader and will control the red/green indicators of the traffic signaling devices in each vehicle. However, in other embodiments, the algorithm may also check other factors, for example, the speed of the two vehicles, the acceleration of the two vehicles, and possibly other conditions, such as the number of vehicles in each approach. Thus, selection of the VTL Leader could be different if, for instance, one approach to the intersection has 10 vehicles while the other approach has only 1 vehicle and the distances are 70 meters and 60 meters, respectively.

Figure 3:
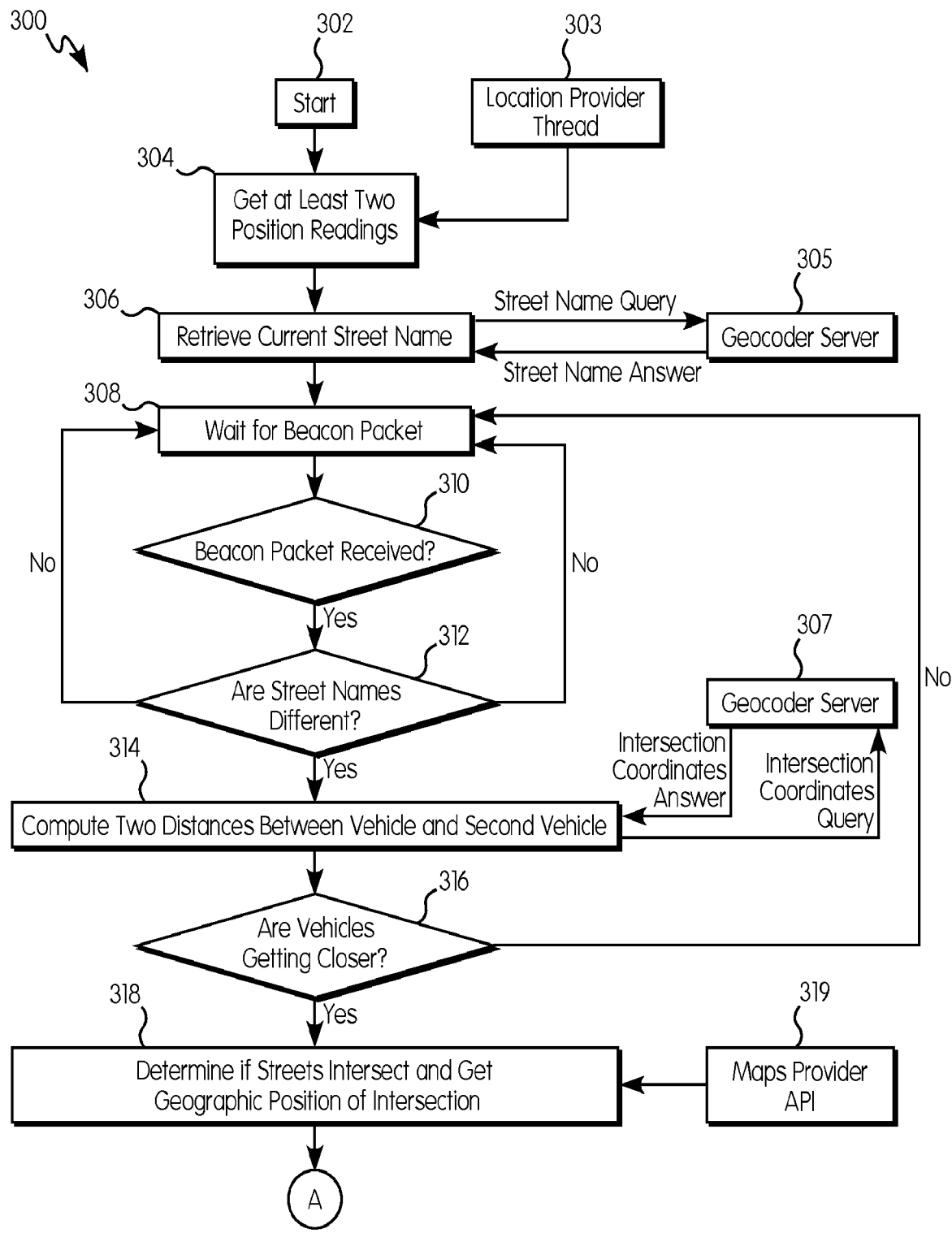
FIG. 3 is a flowchart of the localization algorithm.

The details of the localization algorithm 300 are shown in flowchart form in FIG. 3. It should be noted that, once the localization algorithm is executed, if there is an ensuing conflict, the VTL system will continue with the VTL leader selection algorithm 400, shown in FIG. 4.

With reference to FIG. 3, the localization algorithm starts at 302. At 304 the latitude and longitude of the vehicle at two different times is obtained from location provider thread 303. At 306, the street name that the vehicle is traveling on is obtained, given the latitude and longitude, from a geocode server 305. At 308 and 310, the algorithm waits to receive a beacon packet from another vehicle. Once a beacon packet has been received, at 312, it is determined if the street names are the same or different. If the street names are the same, the algorithm returns to 308 to receive another beacon packet because the vehicles are not on intersection streets. If the street names differ, indicating that the vehicles are on different, possibly intersecting, streets, at 314, the algorithm determines if the distance between the two vehicles is getting smaller or getting larger. At 316, if the vehicles are getting farther apart, indicating that one or the other of the vehicles traveling away from the intersection, control returns to 308 where the vehicle waits for receipt of another beacon packet. If the vehicles are getting closer at 316, indicating that the vehicles may be both approaching the intersection, control proceeds to 318 where the latitude and longitude of the intersection is retrieved, given the street names, from a maps provider API 319.

Figure 4:
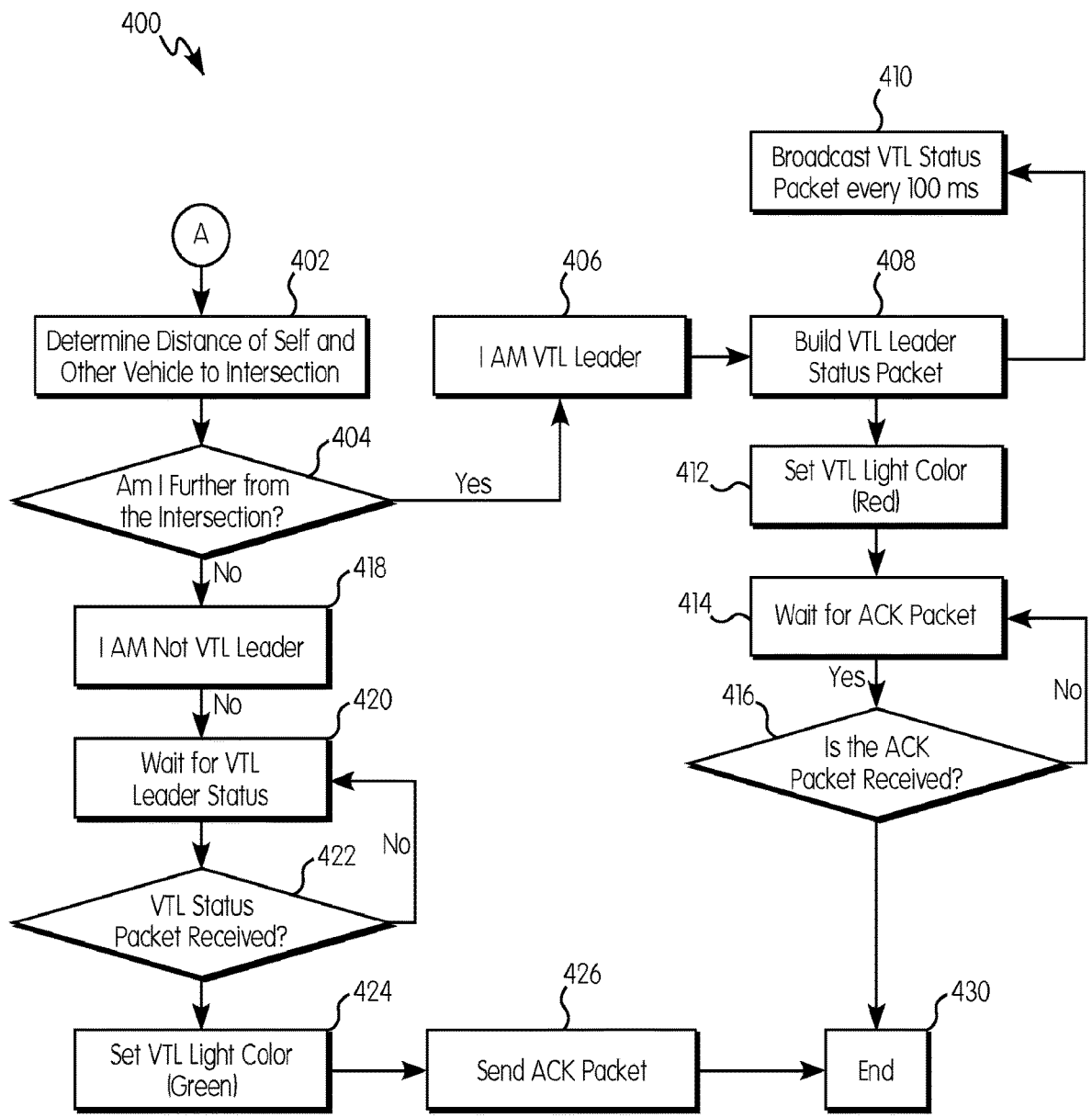
FIG. 4 is a flowchart of the VTL leader election process.

The VTL leader selection process 400 is shown in FIG. 4. At 402 the distance of each vehicle from the center of the intersection is calculated. At 404, the algorithm preferably determines if it is farther than the other vehicle to the intersection and, if so, declares itself the VTL leader at 406. Alternatively, other factors could also be taken into account, as described above. At 408 the VTL leader status packet is built and, at 410, a status packet is broadcast multiple times with the intended recipients being all vehicles approaching the intersection. At 412, the color of the traffic light indicator in the vehicle is set to indicate red. At 414 and 416, the algorithm waits for an acknowledgment packet indicating that the other vehicle has received the VTL status packet. If the acknowledgment is received, the algorithm ends at 430.

At 404, if the algorithm determines that the other vehicle is farther from the intersection, then, at 418, the algorithm declares that it's vehicle is not the VTL leader and, at 420 and 422, the algorithm waits for receipt of the VTL status packet from the VTL leader. Once the VTL status packet is received, the algorithm sets the color of the traffic light indicator in the vehicle to indicate green and the acknowledgment packet is sent to the VTL leader at 462.

Mathematical Basis

Figure 5:
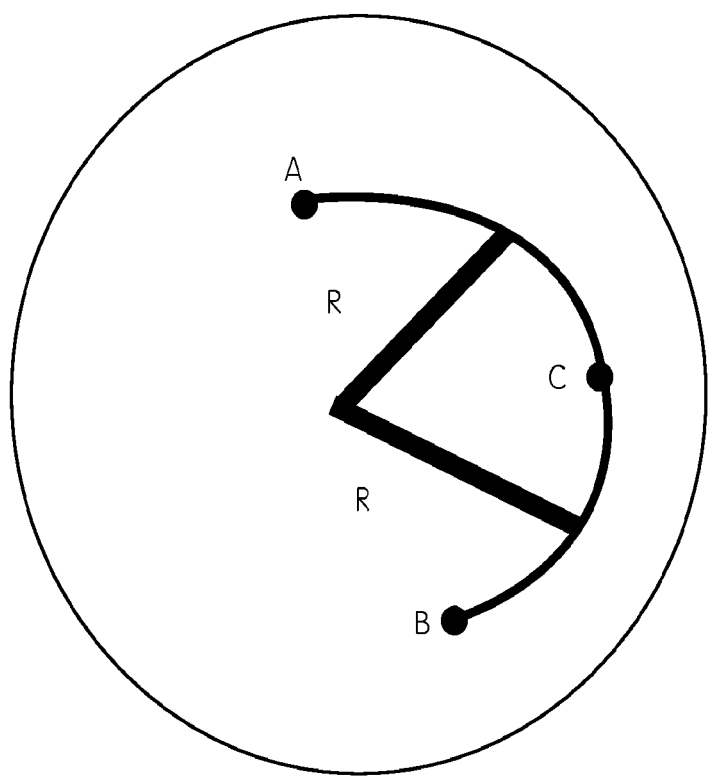
FIG. 5 is an illustration of calculating the non-Euclidean distances.

FIG. 5 shows two arcs of a circle with constant radius R. Let $L_1$ and $L_2$ denote the lengths of the arc AC and arc CB, respectively. Suppose $L_1 > L_2$.

The spherical coordinates are $(R, \Theta, \Phi)$ where $\Theta$ is in the range of $(-\pi, \pi)$ and $\Phi$ is in the range $$[\frac{\pi}{2}, \frac{\pi}{2}].$$

$\Theta$ and $\Phi$ represent the longitude (parallel arc) and the latitude (meridian arc) of each point, respectively.

The spherical coordinates of these points are given by:

$$A=(R,\Theta_a,\Phi_a)$$

$$B=(R,\Theta_b,\Phi_b)$$

$$C=(R,\Theta_c,\Phi_c)$$

If $L_1 > L_2$, then:

$$(\Theta_a-\Theta_c)^2+(\Phi_a-\Phi_c)^2>(\Theta_b-\Theta_c)^2+(\Phi_b-\Phi_c)^2 \qquad (3)$$

And $$(\Theta_a-\Theta_c)^2 \sin\Phi_a \sin\Phi_c+(\Phi_a-\psi_c)^2>(\Theta_b-\Theta_c)^2 \sin\Phi_b \sin\Phi_c+(\Phi_b-\Phi_c)^2 \qquad (4)$$

Eq. (3) is obtained by using flat-surface approximation and by considering the earth radius constant. Eq. (4) is an approximation obtained by applying the Taylor series of cosine function over the real distance.

Intuitively, if a point B on a sphere is closer than another point A with respect to a reference point C, then the angular distance between B and C will also be less than the angular distance between A and C.

Figure 6:
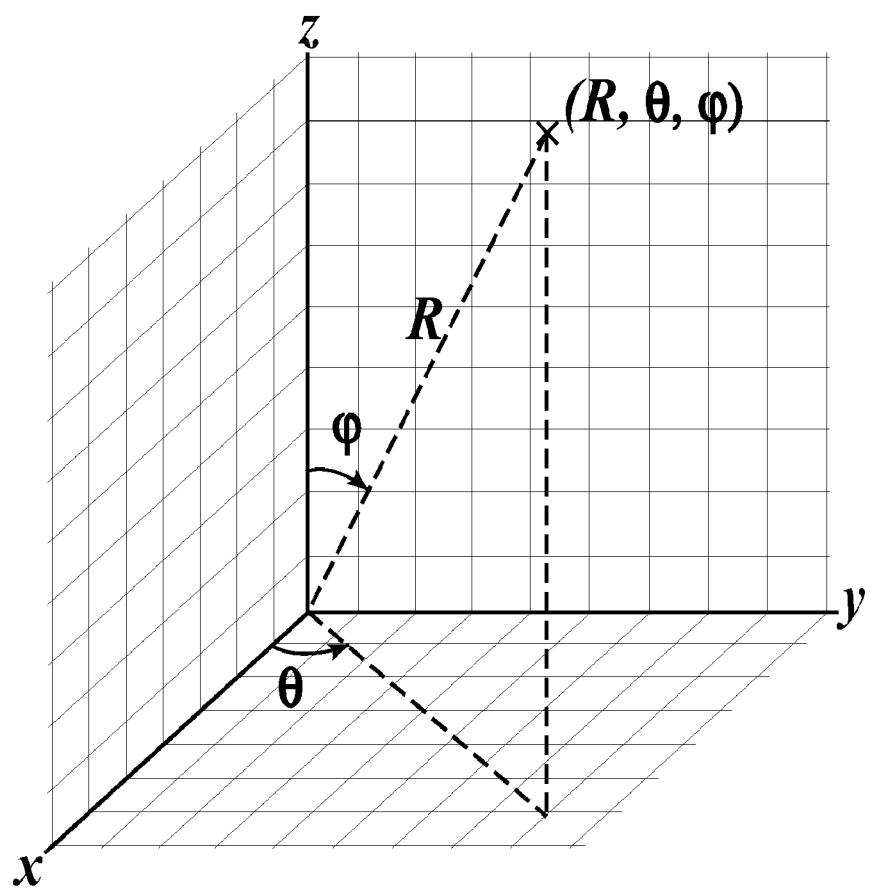
FIG. 6 illustrates the conversion of spherical coordinates to Euclidean coordinates.

A generic point $K_S$ in spherical coordinates $K_S=(R, \Theta, \Phi)$, as shown in FIG. 6, can be represented in Euclidean coordinates with the following transformation:

$$K_e=(x,y,z)=(R\times\cos\Theta\times\sin\Phi, R\times\sin\Theta\times\sin\Phi, R\times\sin\Phi) \qquad (5)$$

To find the real distance between 2 points on a sphere, one can proceed as follows:

$$d_e = \sqrt{(x_a - x_b)^2 + (y_a - y_b)^2 + (z_a - z_b)^2} \qquad (6)$$

where $(x_a, y_a, z_a)$ and $(x_b, y_b, z_b)$ are the transformed Euclidean coordinates of points A and B, respectively.

Figure 7:
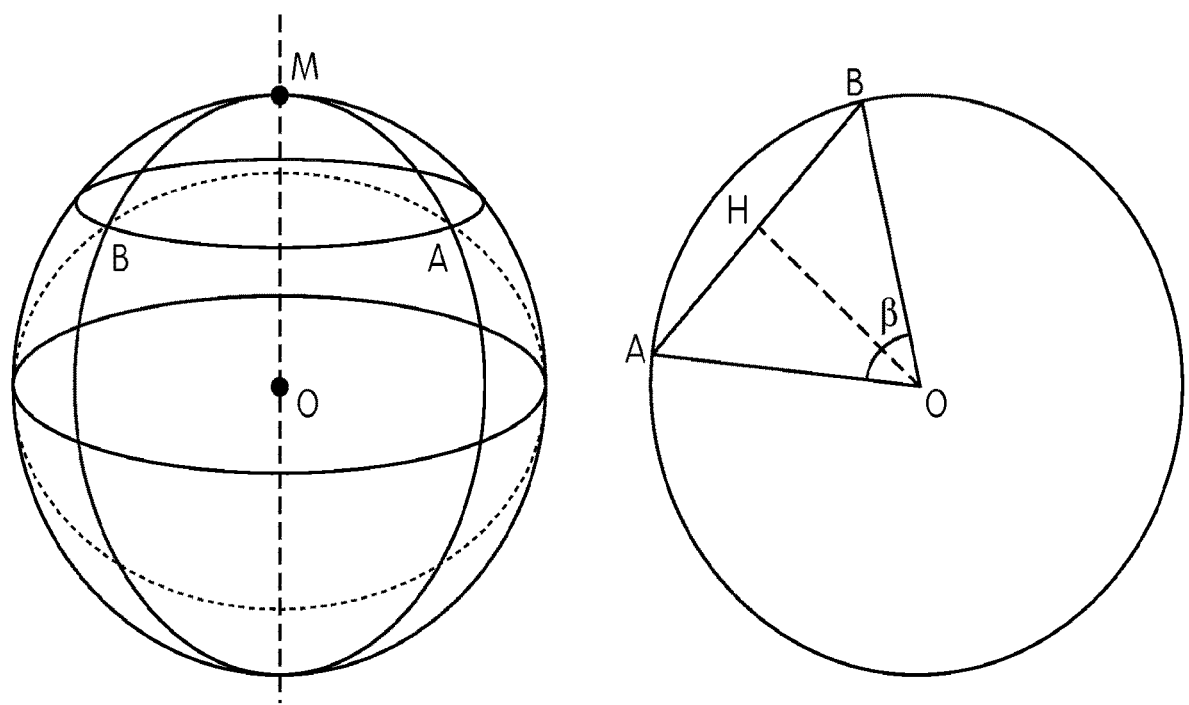
FIG. 7 illustrates computing the distance between two points on a sphere.

Between the points A and B, there only exists one circumference with radius R. This Euclidean distance can be interpreted as the rope length between A, B on this circumference, as shown in FIG. 7.

The $\beta$ angle can be calculated as:

$$\beta = \arcsin\left(\frac{d_e}{2R}\right) \qquad (7)$$

The real distance between the points A and B on the sphere is:

$$d_r = \beta R \quad (8)$$

From the hypothesis, we know that the following inequality should hold $$d_r(A,C) > d_r(C,B) \quad (9)$$

Using the previous formulas and the fact that the radius is constant and the arcsin( ) function is monotonically increasing in the dominion, one can conclude that:

$$d_e(A,C) > d_e(C,B) \quad (10)$$

Hence, we have:

$$\sqrt{\begin{array}{l}(\cos\Theta_a \sin\Phi_a - \cos\Theta_c \sin\Phi_c)^2 + \\ (\sin\Theta_a \sin\Phi_a - \sin\Theta_c \sin\Phi_c)^2 + \\ (\cos\Phi_a - \cos\Phi_c)^2\end{array}} > \quad (11)$$

$$\sqrt{\begin{array}{l}(\cos\Theta_b \sin\Phi_b - \cos\Theta_c \sin\Phi_c)^2 + \\ (\sin\Theta_b \sin\Phi_b - \sin\Theta_c \sin\Phi_c)^2 + \\ (\cos\Phi_b - \cos\Phi_c)^2\end{array}}$$

By solving the squares, we get:

$$\sqrt{2[1 - \sin\Phi_a \sin\Phi_c \cos(\Theta_a - \Theta_c) - \cos\Phi_a \cos\Phi_c]} > \quad (12)$$
$$\sqrt{2[1 - \sin\Phi_b \sin\Phi_c \cos(\Theta_b - \Theta_C) - \cos\Phi_b \cos\Phi_c]}$$

By applying the fact that $|\Theta_a - \Theta_c|$, $|\Theta_b - \Theta_c|$ are sufficiently small, and by using the second order Taylor series expansion of cosine over small angles, namely the fact that for a small angle x, $$\cos(x) = 1 - x^2/2 \quad (13)$$

we get:

$$\sqrt{2 - 2\cos(\Phi_a - \Phi_c) + \sin\Phi_a \sin\Phi_c (\Theta_a - \Theta_c)^2} > \quad (14)$$
$$\sqrt{2 - 2\cos(\Phi_b - \Phi_c) + \sin\Phi_f \sin\Phi_c (\Theta_b - \Theta_c)^2}$$

By applying the fact that the angles $|\Phi_a - \Phi_c|$, $|\Phi_b - \Phi_c|$ are sufficiently small and using a second order Taylor Series expansion of cosine for any small angle, we get:

$$(\Theta_a - \Theta_c)^2 \sin\Phi_a \sin\Phi_c + (\Phi_a - \Phi_c)^2 > (\Theta_b - \Theta_c)^2 \sin\Phi_b \sin\Phi_c + (\Phi_b - \Phi_c)^2 \quad (15)$$

Which establishes the necessary and sufficient conditions for the hypothesis to hold.

Delay Performance

The query should work with a stringent delay constraint. The selection of the VTL leader should be done in a time interval of less than 7 seconds for safety reasons. The geocode query, with an active Internet connection, takes between 100 ms-500 ms, which is in the range required for success of the algorithm.

The query was tested in different environments and the response time depends greatly on the network connectivity and congestion. However, even in a bad environment the query can be accomplished within 500 ms.

Table 1 shows the result of two queries for two different intersections. As shown, the query returns the latitude and the longitude of the intersection and the computation time. The test was done using the LTE 4G network, mimicking the real VTL scenario.

TABLE 1

1) Latitude = 40.4419548
Longitude = −79.9628374
Location= Terrace Street & Darragh Street,
University of Pittsburgh, Pittsburgh, PA 15213, USA
Time: 377
2) Latitude = 40.45189
Longitude = −79.9520215
Location= Centre Avenue & North Craig Street,
Pittsburgh, PA 15213, USA
Time: 179

For VTL implementation, the localization algorithm and the VTL leader selection algorithm are combined.

The assisted GPS system of each smartphone can provide the position or location of each smartphone (and hence the vehicle). The location API in Google Maps can provide this information. The coordinates of the center of an intersection can be determined using the Google Geocode API. When a vehicle A receives a beacon packet from another vehicle B, it first checks the address information. If the street of B is different from that of A, this implies that there is an upcoming intersection.

By submitting a query which includes the names of these two different streets, Google API geocode returns the latitude and altitude of the intersection, which can easily be converted to Cartesian Coordinates. Once the vehicle positions and the intersection position are determined, the remaining task is to determine direction in which the vehicles are moving. By looking at the latitude and longitude information of consecutive beacon packets coming from vehicle B, vehicle A can determine whether vehicle B is moving towards the intersection or away from the intersection. If both vehicle A and vehicle B are moving toward the intersection, then an ensuing conflict exists and a VTL leader must be selected to resolve the conflict and manage the competing traffic flows. If, on the other hand, vehicle B is moving away from the intersection while A is moving toward the intersection, this does not constitute a conflict and, therefore, there is no need to choose a VTL leader by executing the VTL leader selection algorithm 400. As the preferred embodiment, the developed conflict detection algorithm utilizes Google Maps and the API's available on Google Maps.

While the invention is explained using services provided by Google Maps, other embodiments using other map services, for example, Apple Maps, Tiger Maps, Open Street Maps, etc. as the basis of the localization and conflict detection for establishing the VTL leader and implementing the VTL localization algorithm 300 are possible and are within the scope of the invention.

The algorithms may be embodied in an app suitable for execution on a smartphone or tablet computing device having a screen to provide a visual indication of a traffic signal when approaching an intersection. In certain embodiments, the smartphone or tablet computing device may communicate with other vehicles via a DSRC transceiver provided as an aftermarket product or installed by the vehicle manufacturer in the vehicle, as will soon be required by the U.S. Department of Transportation. Alternatively, any other means by which smart phones or tablet computing devices communicate with each other are within the scope of the invention, including, for example, LTE, Wi-Fi, Bluetooth, Wi-Fi direct, etc. In alternative embodiments, a dedicated computing device having a display screen could be used to implement the algorithms and communicate with other vehicles. In yet other embodiments, the app may execute the algorithms and communicate with a vehicle via a product such as Apple Carplay to provide a visual display of the traffic light indicator on a display screen installed in the vehicle or in a heads-up display.

It should also be realized that the method of the present invention may be used in conjunction with the ideal VTL method set forth in U.S. Pat. No. 8,972,159 or with the non-ideal VTL method set forth in PCT application PCT/US18/54504.

To those skilled in the art to which the invention relates, many modifications and adaptations of the invention will suggest themselves. Implementations provided herein, including implementations using various components or arrangements of components should be considered exemplary only and are not meant to limit the invention in any way. As one of skill in the art would realize, many variations on implementations discussed herein which fall within the scope of the invention are possible. Accordingly, the exemplary methods and apparatuses disclosed herein are not to be taken as limitations on the invention but as an illustration thereof. Additionally, it should also be realized that the invention is not limited to on-road vehicles, but may be implemented with respect to many other types of vehicles, including, for example, vehicles used at an airport or sea port for carrying passengers, food, luggage, etc., vehicles used in military camps or warehouses, aircraft, including unmanned and/or autonomous drones, seacraft, railroads, transit lines, etc. Additionally, it should also be realized that the invention is not only applicable to human operated vehicles but may also be used to inform autonomous control systems for any type of vehicles, including autonomous vehicles.

We claim:

1. A software-implemented method in a first vehicle for determining a lead vehicle at an intersection for controlling a virtual traffic light comprising:
 receiving one or more data packets from a second vehicle;
 determining, based on the received one or more data packets, that the first and second vehicles are converging on an intersection;
 determining a first distance of the first vehicle from the intersection and a second distance of the second vehicle from the intersection;
 determining the lead vehicle based on the first and second distances from the intersection;
 determining, by the lead vehicle, a right-of-way for the intersection; and
 displaying, in the first vehicle, a traffic light indicator indicating the right-of-way for the intersection;
 wherein determining if the first and second vehicles are converging on the intersection comprises:
  retrieving a first street name on which the first vehicle is travelling;
  retrieving a second street name on which the second vehicle is travelling; and
  determining that the first and second vehicles are moving toward each other and comparing the first and second street names to determine that they are different and that the first and second streets intersect.

2. The method of claim 1 wherein determining if the first and second vehicles are moving toward each other comprises:
 determining a first geographic position for the first vehicle;
 retrieving a first geographic position for the second vehicle from the one or more data packets;
 calculating a first distance between the first vehicle and the second vehicle based on the first geographic position for the first vehicle and the first geographic position of the second vehicle;
 determining a second geographic position for the first vehicle;
 retrieving a second geographic position of the second vehicle from the one or more data packets;
 computing a second distance between the first vehicle and the second vehicle based on the second geographic position for the first vehicle and the second geographic position of the second vehicle;
 determining that a relative distance of the first vehicle and the second vehicle is decreasing, based on a difference between the first distance and the second distance.

3. The method of claim 1 wherein:
 retrieving the first street name on which the first vehicle is travelling comprises querying an online mapping service using the geographic position of the first vehicle or retrieving the first street name from a local mapping database; and
 retrieving the second street name on which the second vehicle is travelling comprises querying the online mapping service using the geographic position of the second vehicle or retrieving the second street name from the received one or more data packets.

4. The method of claim 2 wherein determining a first distance of the first vehicle from the intersection and a second distance of the second vehicle from the intersection comprises:
 retrieving a geographic position of the intersection;
 calculating a first angular distance between the second geographic position of the first vehicle and the geographic position of the intersection; and
 calculating a second angular distance between the second geographic position of the second vehicle and the geographic position of the intersection;
 wherein the angular distances are based on the radius of the Earth.

5. The method of claim 4 wherein determining the lead vehicle comprises declaring the farthest from the intersection among the first and second vehicles as the lead vehicle and the closest to the intersection among the first and second vehicles as a non-lead vehicle.

6. The method of claim 5 wherein the lead vehicle performs the steps of:
 building a status data packet and broadcasting the status data packet one or more times, the status data packet indicating, based on the determined right-of-way, a status of a traffic light indicator of the lead vehicle and the status of a traffic light indicator of the non-lead vehicle;
 setting the traffic light indicator in the lead vehicle based on the determined right-of-way; and
 waiting for an acknowledge data packet from the non-lead vehicle.

7. The method of claim 6 wherein the non-lead vehicle performs the steps of:
 receiving the status packet from the lead vehicle;
 setting the traffic light indicator in the non-lead vehicle based on the status of the traffic light indicator of the non-lead vehicle in the status packet; and
 sending the acknowledge data packet to the lead vehicle.

8. The method of claim 2 wherein the first and second geographic positions of the first vehicle are retrieved from a GPS unit on board the first vehicle.

9. The method of claim 1 wherein the method is implemented as software executing as an application on a mobile computing device.

10. The method of claim 9 wherein the one or more data packets are sent and received via a communication interface built into the mobile computing device.

11. The method of claim 10 wherein the communication interface built into the mobile computing device comprises LTE, Wi-Fi, Bluetooth, 4G, 5G, RFID or Wi-Fi direct.

12. The method of claim 9 wherein the one or more data packets are sent and received via an interface between the mobile computing device and an external dedicated short range communication radio.

13. A traffic control system comprising:
a mobile computing device in a first vehicle;
a display screen on the mobile computing device;
an application installed on the mobile computing device for performing the functions of:
  receiving one or more data packets from a second vehicle;
  determining, based on the received data packets, that the first and second vehicles are converging on an intersection;
  determining a first distance of the first vehicle from the intersection and a second distance of the second vehicle from the intersection;
  determining the lead vehicle based on the distances from the intersection of the first and second vehicles, the lead vehicle controlling virtual traffic lights at the intersection; and
  displaying a traffic light indicator indicating a right-of-way for the intersection on the display screen, the right-of-way being determined by the lead vehicle;
wherein determining if the first and second vehicles are converging on the intersection comprises:
  retrieving a first street name on which the first vehicle is travelling;
  retrieving a second street name on which the second vehicle is travelling; and
  determining that the first and second vehicles are moving toward each other and comparing the first and second street names to determine that they are different and that the first and second streets intersect.

14. The system of claim 13 further comprising a GPS unit, wherein the first distance is calculated as a difference between a geographic position of the first vehicle retrieved from the GPS unit and a geographic position of the intersection.

15. The system of claim 13 wherein the one or more data packets are received via a communication interface built into the mobile computing device, the communication interface comprising LTE, Wi-Fi, RFID, 4G, 5G, Bluetooth or Wi-Fi direct.

16. The system of claim 13 wherein the one or more data packets are sent and received via an interface between the mobile computing device and an external dedicated short range communication radio.

17. The system of claim 13 wherein determining the lead vehicle for the intersection comprises declaring the farthest from the intersection among the first and second vehicles as the lead vehicle and the closest to the intersection among the first and second vehicles as a non-lead vehicle.

18. The system of claim 17 wherein the lead vehicle yields leadership to a vehicle travelling in an orthogonal direction based on a number of vehicles in a cluster of the lead vehicle and a number of vehicles in a cluster of the vehicle travelling in the orthogonal direction.

19. The system of claim 17 wherein:
the traffic light indicator is red if the first vehicle is determined to be the lead vehicle; and
the traffic light indicator is green if the first vehicle is determined to be a non-lead vehicle.

* * * * *